US012572384B2

(12) United States Patent　　　(10) Patent No.: US 12,572,384 B2

Jonnalagadda　　　(45) Date of Patent: Mar. 10, 2026

(54) PROFICIENCY SCORING FOR USER-SYSTEM COLLABORATION

(71) Applicant: Hexagon Technology Center GmbH, Heerbrugg (CH)

(72) Inventor: Ravi S. Jonnalagadda, Waltham, MA (US)

(73) Assignee: Hexagon Technology Center GmbH, Heerbrugg (CH)

( * ) Notice: Subject to any disclaimer, the term of this patent is extended or adjusted under 35 U.S.C. 154(b) by 406 days.

(21) Appl. No.: 18/138,605

(22) Filed: Apr. 24, 2023

(65) Prior Publication Data

US 2024/0354153 A1　　Oct. 24, 2024

(51) Int. Cl.
*G06F 9/48*　　　　(2006.01)

(52) U.S. Cl.
CPC ................................. *G06F 9/4881* (2013.01)

(58) Field of Classification Search
None
See application file for complete search history.

(56) References Cited

U.S. PATENT DOCUMENTS

| | | | |
|---|---|---|---|
| 8,019,813 B2 * | 9/2011 | Pope | G06Q 10/06 709/219 |
| 9,305,263 B2 * | 4/2016 | Horvitz | G06N 5/043 |
| 10,152,693 B2 * | 12/2018 | Tayarani | G06Q 10/103 |
| 11,403,552 B2 * | 8/2022 | Pimplikar | G06N 20/00 |
| 12,254,055 B2 * | 3/2025 | Perelli-Minetti | G06F 16/9536 |
| 2001/0025296 A1 * | 9/2001 | Narang | G06Q 10/10 709/201 |
| 2019/0295027 A1 * | 9/2019 | Dunne | G06Q 10/063112 |
| 2020/0074350 A1 | 3/2020 | Pimplikar et al. | |

OTHER PUBLICATIONS

International Search Report and Written Opinion for U.S. Patent Application No. PCT/US2024/025326 dated Sep. 4, 2024, 12 pages.

* cited by examiner

*Primary Examiner* — Van H Nguyen

(74) *Attorney, Agent, or Firm* — Nutter McClennen & Fish LLP

(57) ABSTRACT

A method executes, using a computing system, tasks of a collaborative process for iterations. The tasks include a user-system conditioning task. The method determines scenario characteristics and outcomes in response to executing the tasks for the iterations. The method generates a machine learning model using the scenario characteristics and the outcomes. The method inputs a scenario characteristic into the machine learning model. The method outputs a proficiency score from the machine learning model. The method adjusts the user-system conditioning task in response to the proficiency score. The method then executes, using the computing system, the collaborative process including the adjusted user-system conditioning task.

16 Claims, 2 Drawing Sheets

PROFICIENCY SCORING FOR USER-SYSTEM COLLABORATION

FIELD

Illustrative embodiments of the invention generally relate to user-system collaboration and, more particularly, various embodiments of the invention relate to task division between user and computing system collaborators.

BACKGROUND

A human and a machine may collaborate to complete a project having multiple tasks. Where the human and the machine are able to perform the same task of a project, it may be unclear how to assign or divide the task.

SUMMARY OF VARIOUS EMBODIMENTS

In accordance with one embodiment of the invention, a method executes, using a computing system, tasks of a collaborative process for iterations. The tasks include a user-system conditioning task. The method determines scenario characteristics and outcomes in response to executing the tasks for the iterations. The method generates a machine learning model using the scenario characteristics and the outcomes. The method inputs a scenario characteristic into the machine learning model. The method outputs a proficiency score from the machine learning model. The method adjusts the user-system conditioning task in response to the proficiency score. The method executes, using the computing system, the collaborative process including the adjusted user-system conditioning task.

In some embodiments, the method generates a second machine learning model using the scenario characteristics and the outcomes. The method inputs a second scenario characteristic into the machine learning model. The method outputs a second proficiency score from the machine learning model. The first proficiency score corresponds to a user and the first user-system conditioning task. The tasks include the second user-system conditioning task of the collaborative process. The second proficiency score corresponds to the user and the second user-system conditioning task.

In some embodiments, the method adjusts the second user-system conditioning task in response to the second proficiency score. The method executes, using the computing system, the collaborative process including the second adjusted user-system conditioning task.

Executing the collaborative process including the adjusted user-system conditioning task may include removing all tasks after the adjusted user-system conditioning task in response to adjusting the user-system conditioning task.

The user-system conditioning task may include a user subtask assigned to a user and a machine subtask. The machine subtask may include transmitting instructions to the user. Adjusting the user-system conditioning task may include eliminating the machine subtask.

The outcome may include a user performance metric for the user-system conditioning task for each iteration. The machine subtask may include waiting for the user to complete the user subtask and determining the user performance metric.

The iterations may correspond to one user. The computing system may also execute the collaborative process including the adjusted user-system conditioning task with the user.

In some embodiments, the method tags the tasks and determines a user-system conditioning tasks using the tagged tasks.

An outcome may include a user response score and the scenario characteristic may include at least one of a familiarity score or an environmental condition.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
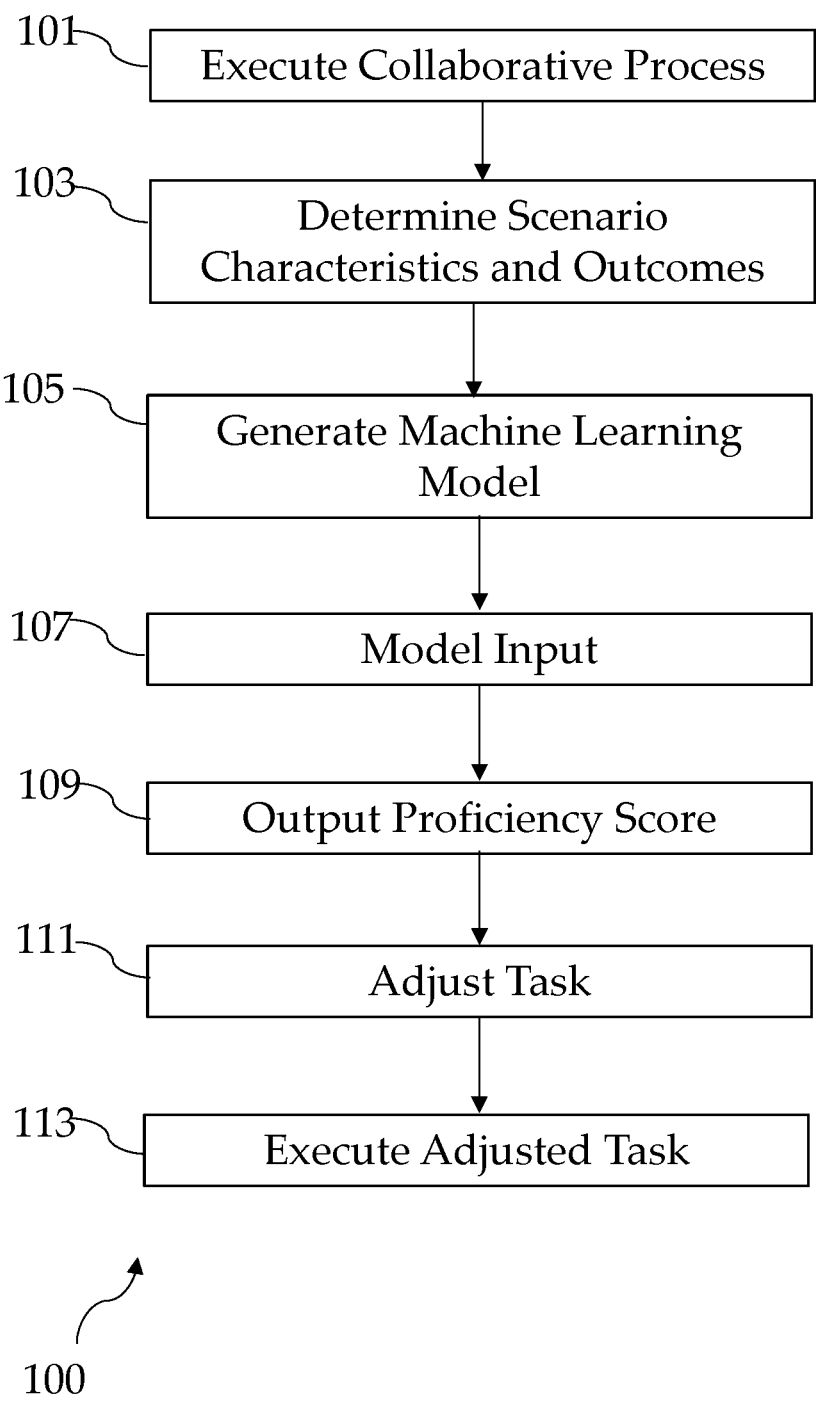
FIG. 1 shows a process for collaborating between the collaboration system and a user in accordance with various embodiments.

In illustrative embodiments, a collaboration system works with a user to complete a collaborative process. The collaborative process may include tasks which could be performed by the user alone or by the user with assistance from the system. The collaboration system generates a machine learning model to assign tasks of a collaborative process based on the proficiency of the user. Details of illustrative embodiments are discussed below.

A collaborative process may be a set of tasks in which the collaboration system may work together with the user to complete the set of tasks. During an iteration of the collaborative process, tasks may be performed by the collaboration system, the user, and or a combination of the collaboration system and the user (also known as a user-system conditioning task or conditioning task). For different iterations of the collaborative process, the collaboration system may assign the same task differently. For example, in a first iteration of the collaborative process, the collaboration system may perform a task by itself, but in a subsequent iteration of the collaborative process, the collaboration system may assign the task to the user or perform the task with the user.

As the user becomes more sufficient, the collaboration system may perform fewer tasks while executing the collaborative process. The tasks not performed by the collaboration system may be assigned to the user, or removed from the set of tasks of the collaborative process.

In some embodiments, the user-system conditioning task may have a subtask performed by the collaboration system, and another subtask performed by the user. For example, for a task of designing a bridge footing, the system subtask may be to display an assortment of footings which meet the required parameters of a project. The user subtask may be selecting one of the footings by inputting the selection to the collaboration system.

In some embodiments, the system subtask may include presenting the user with detailed instructions (e.g., driving directions, cooking instructions, scenario response instructions), and the user subtask may include following the detailed instructions. The system subtask may further include waiting for the user to complete the user subtask and determining one or more user performance metrics based on the execution of the user subtask. In one example, the system subtask may be to present the required parameters of the footing to the user, and the user subtask may be to select a proper fitting based on the parameters presented by the collaboration system. The collaboration system may then determine performance metrics based on how the user completed the task.

In some embodiments, the collaboration system may be limited by which tasks may assigned to the user in whole or in part. The collaboration system may determine which tasks are assignable to the user using tags corresponding to each of the tasks. The tags may be assigned using user input, or the tags may assigned by the collaboration system. For example, the collaboration system may tag tasks where the collaboration system is able to receive data on the user's execution of the task.

FIG. 1 shows a process 100 for collaborating between the collaboration system and the user in accordance with various embodiments. The process 100 may be implemented in whole or in part in one or more of the collaboration systems disclosed herein. In certain forms, the functionalities may be performed by separate devices of the collaboration system. In certain forms, all functionalities may be performed by the same device of system. It shall be further appreciated that a number of variations and modifications to process 100 are contemplated including, for example, the omission of one or more aspects of process 100, the addition of further conditionals and operations, or the reorganization or separation of operations and conditionals into separate processes.

The process 100 begins at operation 101 where collaboration system executes a collaborative process with the user. The collaborative process includes at least one user-system conditioning task. Since the purpose of operation 101 is to allow the collaboration system to observe the user performing tasks of the collaborative process, the operation 101 may include performing the collaborative process for multiple iterations. The operation 101 may include performing the collaborative process repeatedly until the collaboration system has received enough data corresponding to the user performing tasks of the collaborative process to generate a machine learning model.

The process 100 collects data corresponding to the collaborative process and the user during operation 103. The process 100 may perform operation 103 before, during, or after operation 101 is occurring, the collaboration system may aggregate data about the collaborative process iteration. The collaboration system may use the aggregated data to determine outcomes of individual tasks or an outcome of the entire collaborative process. The outcomes may include feedback indicating that the user completed the task or feedback indicating a user performance metric, such as a time duration to complete the task, a percentage of the task that was completed by the user, or an accuracy of the user in completing the task, among other things.

The collaboration system may also use the aggregated data to determine scenario characteristics corresponding to at least one of the user or the collaborative process. The scenario characteristics may include a familiarity score based on 1) the level of assistance provided to the user during one or more historical iterations of a task or collaborative process, 1) a number of times the user has completed the collaborative process, or 3) a number of times the user has completed a particular task of the collaborative process, 4) the time since the most recent execution of the collaborative process, among other things. The scenario characteristics may also include an environmental condition, such as weather, noise, or user health, among other things.

In operation 105, the collaboration system generates a machine learning model to determine a proficiency score corresponding to a likelihood the user will successfully complete a task given the scenario characteristics.

In some embodiments, the machine learning model is generated using data corresponding to one user executing the collaborative process. Therefore, the machine learning model may be personalized for a user such that the collaboration system generates a machine learning model for each user. In other embodiments, the data aggregated for multiple users may be used to generate the machine learning model.

In some embodiments, the collaboration system generates a machine learning model to determine a proficiency score for each of one or more of the tasks or subtasks assignable to a user, and/or each of one or more of the system tasks or subtasks which may be removed from the collaborative process based on user proficiency. In some embodiments, the collaboration system generates a machine learning model to determine a proficiency score corresponding to the collaborative process as a whole.

In some embodiments, the collaboration system generates a machine learning model by training a supervised machine learning model, such as a neural network, among other things. The collaboration system may determine a training data set from the scenario characteristics and the outcomes. For example, the collaboration system may determine a proficiency score from the outcomes, the proficiency score being a likelihood the user will successfully complete a task in a future iteration of the collaborative process. The proficiency score may be a classification (e.g., proficient or not proficient). The proficiency score may also be a percentage or another type of numerical score. The proficiency score may also indicate one of several categories corresponding to levels of proficiency. In some embodiments, the proficiency scores of the training data are determined using a weighted or logical expression of user performance metrics.

After the collaboration system determines the proficiency score for each historical iteration, the collaboration system may train the supervised machine learning model using training data that includes, for each historical iteration, the proficiency score and the corresponding scenario characteristics.

Beginning in operation 107, the collaboration system uses the machine learning model to control the assignment of tasks to the collaboration system and the user. Before assigning a user-system conditioning task for the present iteration, the collaboration system provides input data, such as the scenario characteristics, to the machine learning model in operation 107.

Using the input data, the machine learning model outputs a proficiency score in operation 109. The proficiency score corresponds to a likelihood the user will complete the unassigned task given the input data.

The collaboration system may use the proficiency score to adjust the user-system conditioning task relative to the previous iteration of the collaborative process in operation 111. Adjusting the user-system conditioning task may include eliminating a system subtask, modifying a system subtask, eliminating a user subtask, or modifying a user subtask. For example, as the proficiency score increases, a system subtask of providing detailed instructions may be adjusted to provided brief instructions or eliminating the system subtask of providing instructions.

After the process 100 adjusts the user-conditioning task, operation 113 executes the collaborative process including the adjusted user-system conditioning task. In some embodiments, executing the collaborative process includes removing all tasks after the adjusted user-system conditioning task.

In one example of the process 100, the collaboration system works with a project manager to manage a large building project based on historical collaboration between the project manager and the collaboration system. Historically, unexpected scenarios have arisen during projects and the collaboration system observes the project manager's response to each of these scenarios, as well as the outcome, also known as results, for each of the responses.

The machine learning model is trained using the observed data from the historical projects to output a proficiency score for the project manager based on the current scenario. With the proficiency score, the collaboration system may adjust a user-conditioning tasks. For example, the collaboration system may no longer provide detailed instructions to the project manager because the project manager is familiar with the scenario, or the collaboration system may transfer a subtask to the project manager because the project manager is now competent enough to perform the subtask.

Figure 2:
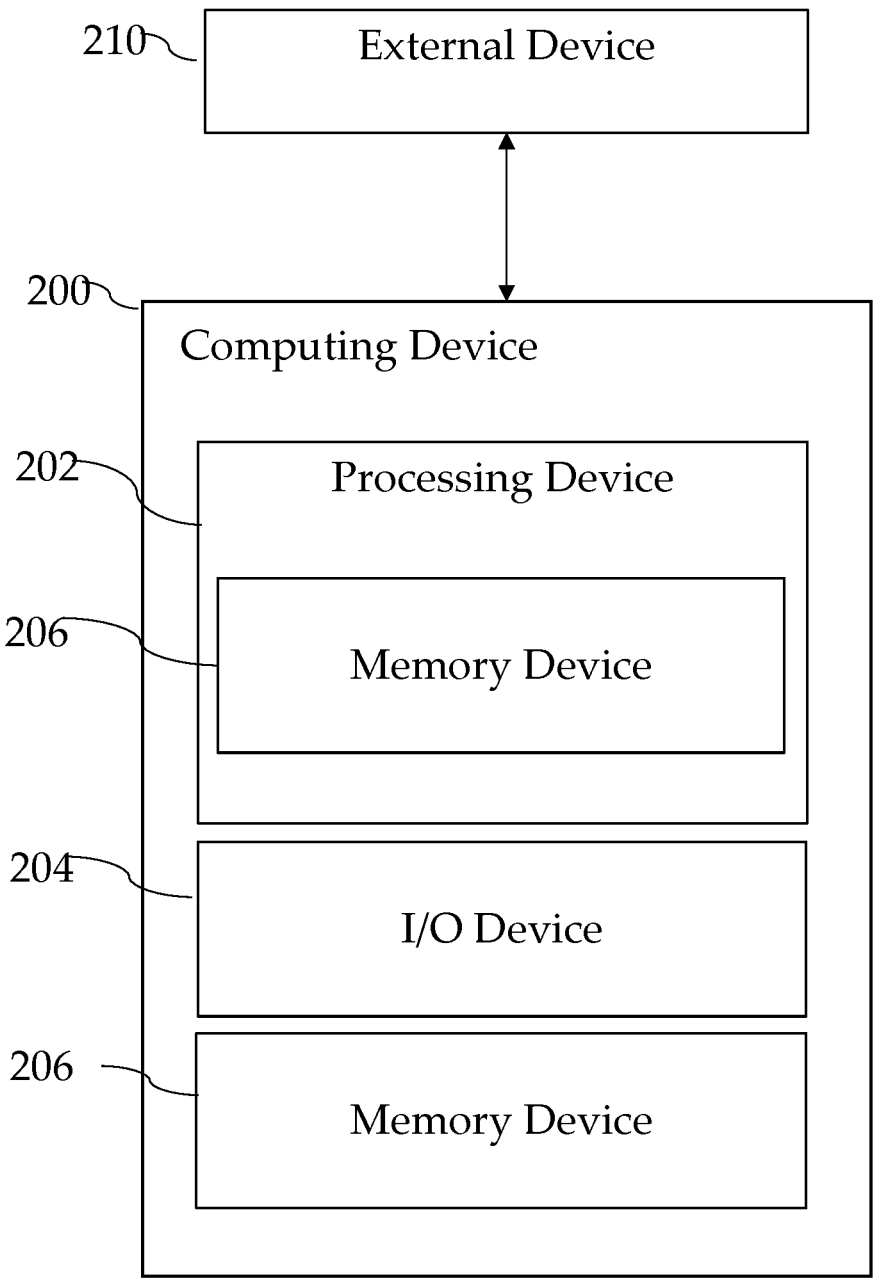
FIG. 2 schematically shows a computing system in accordance with various embodiments.

FIG. 2 schematically shows a computing system 200 in accordance with various embodiments. The computing system 200 is one example of the collaboration system described with respect to process 100. The computing system 200 includes a processing device 202, an input/output device 204, and a memory device 206. The computing system 200 may be a stand-alone device, an embedded system, or a plurality of devices configured to perform the functions described with respect to one of the components of power network. Furthermore, the computing system 200 may communicate with one or more external devices 210.

The input/output device 204 enables the computing system 200 to communicate with an external device 210. For example, the input/output device 204 in different embodiments may be a network adapter, network credential, interface, or a port (e.g., a USB port, serial port, parallel port, an analog port, a digital port, VGA, DVI, HDMI, FireWire, CAT 5, Ethernet, fiber, or any other type of port or interface), among other things. The input/output device 204 may be comprised of hardware, software, and/or firmware. It is contemplated that the input/output device 204 has more than one of these adapters, credentials, or ports, such as a first port for receiving data and a second port for transmitting data.

The external device 210 may be any type of device that allows data to be input or output from the computing system 200. For example, external device 210 in different embodiments is a meter, a control system, a sensor, a mobile device, a reader device, equipment, a handheld computer, a diagnostic tool, a controller, a computer, a server, a printer, a display, a visual indicator, a keyboard, a mouse, a touch screen display, or a GPS satellite, among other things. Furthermore, the external device 210 may be integrated into the computing system 200. More than one external device may be in communication with the computing system 200.

The processing device 202 may be a programmable type, a dedicated, hardwired state machine, or a combination of these. The processing device 202 may further include multiple processors, Arithmetic-Logic Units (ALUs), Central Processing Units (CPUs), Digital Signal Processors (DSPs), Field-programmable Gate Array (FPGA), among other things. For forms of the processing device 202 with multiple processing units, distributed, pipelined, or parallel processing may be used. The processing device 202 may be dedicated to performance of just the operations described herein or may be used in one or more additional applications. The processing device 202 may be of a programmable variety that executes processes and processes data in accordance with programming instructions (such as software or firmware) stored in the memory device 206. Alternatively or additionally, programming instructions are at least partially defined by hardwired logic or other hardware. The processing device 202 may be comprised of one or more components of any type suitable to process the signals received from the input/output device 204 or elsewhere, and provide desired output signals. Such components may include digital circuitry, analog circuitry, or a combination of both.

The memory device 206 in different embodiments may be of one or more types, such as a solid-state variety, electromagnetic variety, optical variety, or a combination of these forms, to name but a few examples. Furthermore, the memory device 206 may be volatile, nonvolatile, transitory, non-transitory or a combination of these types, and some or all of the memory device 206 may be of a portable variety, such as a disk, tape, memory stick, or cartridge, to name but a few examples. In addition, the memory device 206 may store data that is manipulated by the processing device 202, such as data representative of signals received from or sent to the input/output device 204 in addition to or in lieu of storing programming instructions, among other things. As shown in FIG. 2, the memory device 206 may be included with the processing device 202 or coupled to the processing device 202, but need not be included with both.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" or "a portion" is used, the item can include a portion or the entire item unless specifically stated to the contrary. Unless stated explicitly to the contrary, the terms "or" and "and/or" in a list of two or more list items may connote an individual list item, or a combination of list items. Unless stated explicitly to the contrary, the transitional term "having" is open-ended terminology, bearing the same meaning as the transitional term "comprising."

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims. It shall nevertheless be understood that no limitation of the scope of the present disclosure is hereby created, and that the present disclosure includes and protects such alterations, modifications, and further applications of the exemplary embodiments as would occur to one skilled in the art with the benefit of the present disclosure.

What is claimed is:

1. A method, comprising:
   executing, using a computing system including a processor and a memory operatively coupled with the processor, a plurality of tasks of a collaborative process for a plurality of iterations, the plurality of tasks including a user-system conditioning task;

determining a plurality of scenario characteristics and a plurality of outcomes in response to executing the plurality of tasks for the plurality of iterations;
   generating a first machine learning model using the plurality of scenario characteristics and the plurality of outcomes;
   inputting a first scenario characteristic of the plurality of scenario characteristics into the first machine learning model;
   outputting a first proficiency score from the first machine learning model, wherein the first proficiency score corresponds to a likelihood a user will complete a first task of the plurality of tasks;
   adjusting the user-system conditioning task in response to the first proficiency score;
   executing, using the computing system, the collaborative process including the adjusted user-system conditioning task;
   generating a second machine learning model using the plurality of scenario characteristics and the plurality of outcomes;
   inputting a second scenario characteristic of the plurality of scenario characteristics into the second machine learning model; and
   outputting a second proficiency score from the second machine learning model,
   wherein the first proficiency score corresponds to a user and the first user-system conditioning task,
   wherein the plurality of tasks includes the second user-system conditioning task of the collaborative process, and
   wherein the second proficiency score corresponds to the user and the second user-system conditioning task;
   adjusting the second user-system conditioning task in response to the second proficiency score; and
   executing, using the computing system, the collaborative process including the second adjusted user-system conditioning task.

2. The method of claim 1, wherein executing the collaborative process including the adjusted user-system conditioning task includes removing all tasks after the adjusted user-system conditioning task in response to adjusting the user-system conditioning task.

3. The method of claim 1, wherein the user-system conditioning task includes a user subtask assigned to a user and a machine subtask.

4. The method of claim 3, wherein the machine subtask includes transmitting instructions to the user, and wherein adjusting the user-system conditioning task includes eliminating the machine subtask.

5. The method of claim 3, wherein the plurality of outcomes includes a user performance metric for the user-system conditioning task for each iteration, and wherein the machine subtask includes waiting for the user to complete the user subtask and determining the user performance metric.

6. The method of claim 1, wherein the plurality of iterations corresponds to one user, and wherein the computing system executes the collaborative process including the adjusted user-system conditioning task with the user.

7. The method of claim 1, comprising:
   tagging the plurality of tasks; and
   determining a plurality of user-system conditioning tasks using the tagged plurality of tasks.

8. The method of claim 1, wherein an outcome includes a user response score and the scenario characteristic includes at least one of a familiarity score or an environmental condition.

9. A computer program product for use on a computer system including a processor and a memory operatively coupled with the processor, for executing a collaborative process with a user, the computer program product comprising a tangible, non-transient computer usable medium having computer readable program code executable by the processor thereon, the computer readable program code comprising:

program code for executing a plurality of tasks of the collaborative process for a plurality of iterations, the plurality of tasks including a user-system conditioning task of the collaborative process;

program code for determining a plurality of scenario characteristics and a plurality of outcomes in response to executing the collaborative process for the plurality of iterations;

program code for generating a first machine learning model using the plurality of scenario characteristics and the plurality of outcomes;

program code for inputting a first scenario characteristic of the plurality of scenario characteristics into the first machine learning model;

program code for outputting a first proficiency score from the first machine learning model, wherein the first proficiency score corresponds to a likelihood a user will complete a first task of the plurality of tasks;

program code for adjusting the user-system conditioning task in response to the first proficiency score;

program code for executing, using the computing system, the collaborative process including the adjusted user-system conditioning task;

program code for generating a second machine learning model using the plurality of scenario characteristics and the plurality of outcomes;

program code for inputting a second scenario characteristic of the plurality of scenario characteristics into the second machine learning model; and program code for outputting a second proficiency score from the second machine learning model, wherein the first proficiency score corresponds to a user and the first user-system conditioning task, wherein the plurality of tasks includes the second user-system conditioning task of the collaborative process, and wherein the second proficiency score corresponds to the user and the second user-system conditioning task;

program code for adjusting the second user-system conditioning task in response to the second proficiency score; and program code for executing, using the computing system, the collaborative process including the second adjusted user-system conditioning task.

10. The computer program product of claim 9, wherein executing the collaborative process including the adjusted user-system conditioning task includes removing all tasks after the adjusted user-system conditioning task in response to adjusting the user-system conditioning task.

11. The computer program product of claim 9, wherein the user-system conditioning task includes a user subtask assigned to a user and a machine subtask.

12. The computer program product of claim 11, wherein the machine subtask includes transmitting instructions to the user, and wherein adjusting the user-system conditioning task includes eliminating the machine subtask.

13. The computer program product of claim 11, wherein the plurality of outcomes includes a user performance metric for the user-system conditioning task for each iteration, and wherein the machine subtask includes waiting for the user to complete the user subtask and determining the user performance metric.

14. The computer program product of claim 9, wherein the plurality of iterations corresponds to one user, and wherein the computing system executes the collaborative process including the adjusted user-system conditioning task with the user.

15. The computer program product of claim 9, comprising:

program code for tagging the plurality of tasks; and program code for determining a plurality of user-system conditioning tasks using the tagged plurality of tasks.

16. The computer program product of claim 9, wherein an outcome includes a user response score and the scenario characteristic includes at least one of a familiarity score or an environmental condition.

* * * * *